United States Patent Office  3,127,240
Patented Mar. 31, 1964

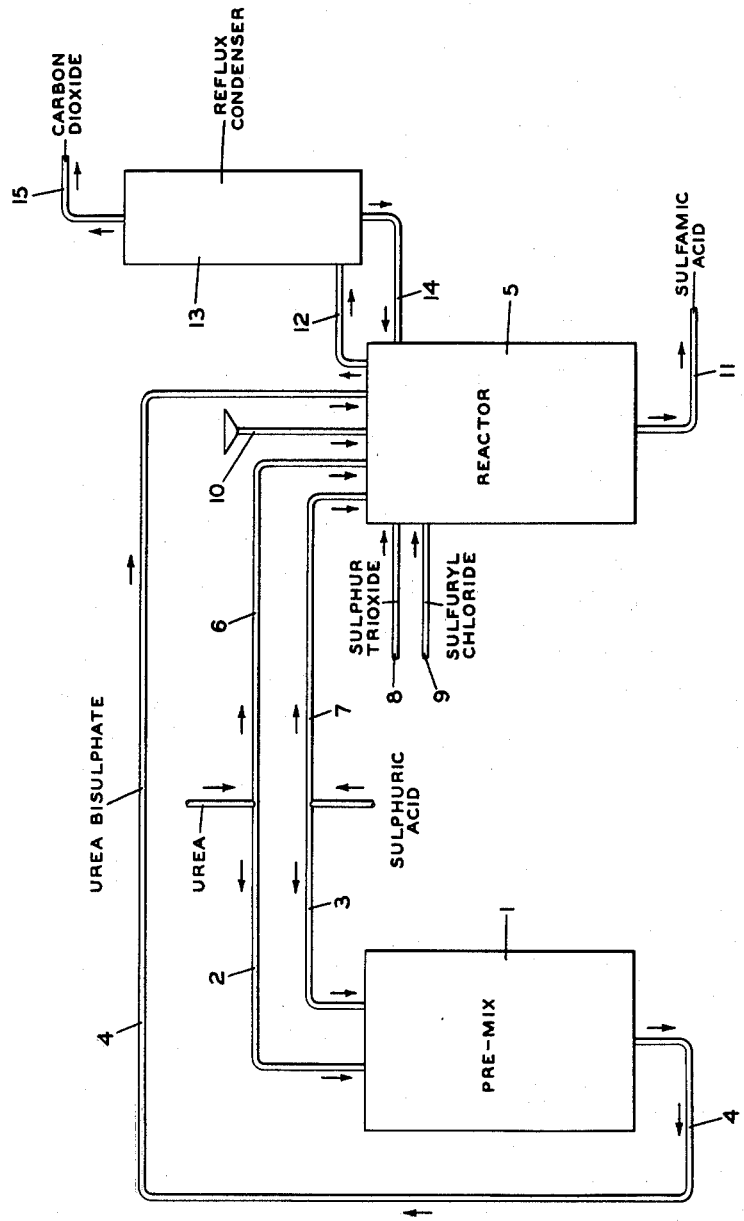

3,127,240
SULFAMIC ACID MANUFACTURE
Everett E. Gilbert and Alphonso W. Marsilio, Morris Township, Morris County, N.J., assignors to Allied Chemical Corporation, New York, N.Y., a corporation of New York
Filed Feb. 19, 1962, Ser. No. 174,022
4 Claims. (Cl. 23—165)

This invention relates to the manufacture of sulfamic acid and more particularly refers to a new and improved process for producing sulfamic acid by reacting urea, sulfur trioxide and sulfuric acid.

Although the reaction of sulfuric acid, sulfur trioxide and urea was known—Baumgarten U.S. Patent 2,102,350, Ber. 69B, 1929–37—from a practical commercial operation many problems were encountered due to the inherent nature of the reaction which is strongly exothermic and normally proceeds with considerable violence. In addition the resultant product, sulfamic acid is a relatively high melting point chemical, 205° C., and consequently presents a serious problem with respect to processing and separation of the sulfamic acid from the reaction products as well as heat transfer. Various methods have been proposed to overcome these processing problems with indifferent success. One suggestion was to use excess sulfuric acid which while it permitted the reaction to be carried out in the liquid phase did not ameliorate all the difficulties and indeed created new problems. More specifically, sulfuric acid being a reactant did not avoid the violence of the reaction and further resulted in a slurry of sulfamic acid in sulfuric acid solution from which it was most difficult to separate the sulfamic acid. Furthermore the operation was complicated by corrosion problems brought about by the many different strengths of sulfuric acid involved. In another attempt to overcome the problems, excess sulfur trioxide, also a reactant, was used as a reaction medium where again it was found difficult to control the reaction and also to remove residual sulfur trioxide from the product. Furthermore the use of excess sulfur trioxide necessitates pressure equipment in the desired temperature range of about 55–75° C. thereby appreciably increasing the cost of capital investment. Other solvent mediums were also tried but found wanting for one or more of the above reasons.

An object of the present invention is to provide an efficient economical process for producing sulfamic acid by reaction of urea, sulfur trioxide and sulfuric acid. A further object of the present invention is to provide a simple and effective means for dissipating the heat of reaction of urea, sulfuric acid and sulfur trioxide to obtain good control of the reaction without interference to the reaction and without complication of separation of the desired sulfamic acid product. Other objects and advantages will be apparent from the following description and accompanying drawing.

In consideration of a good practical commercial process for producing sulfamic acid several factors must be taken into account. For good economical operation the process should be conducted at substantially atmospheric pressure to avoid use of pressure equipment and at a relatively low temperature within the range of about 55–75° C. Control of reaction temperature should be easily and effectively maintained within the narrow range of 55–75° C. without the use of indirect heat exchange contrivances which are generally uneconomical and difficult to manage and maintain within narrow limits. In addition any means for controlling the reaction should avoid the complication of the use of a medium which is reactive and should permit simple and easy recovery of the desired sulfamic acid from the reaction products.

In our investigation for a solution to the problem of commercially producing sulfamic acid we tried various solvent mediums but found that some were reactive and consequently unsuitable because they contaminated the product and others which were inert to the reactants either were of such high boiling point as to require special means for dissipation of heat and complications in separation or were so volatile as to necessitate pressure equipment.

One of the compounds investigated was sulfuryl chloride, a readily available low cost material. This compound, sulfuryl chloride, reacts with urea at a temperature of about 50° C. with the evolution of hydrogen chloride and would appear to be totally unsuitable for use as a solvent in the production of sulfamic acid by reaction of urea, sulfuric acid and sulfur trioxide. However we did try sulfuryl chloride as a solvent medium in the reaction of urea, sulfuric acid and sulfur trioxide and surprisingly and contrary to normal expectations found that under the conditions of operation that sulfuryl chloride is inert with no or insignificant hydrogen chloride evolution. Furthermore it was found that the use of sulfuryl chloride permits easy separation of the final product and of very important significance could be employed as a heat dissipation and temperature control medium by refluxing, since the boiling point of sulfuryl chloride is 69° C., within the reaction temperature range of 55–75° C., thereby eliminating the necessity of pressure equipment.

In accordance with the present invention sulfamic acid may be produced by mixing urea, sulfur trioxide and sulfuric acid in the presence of sulfuryl chloride, maintaining the temperature of reaction within the range of 55–75° C., preferably 66–72° C., under substantially atmospheric pressure, refluxing i.e. passing evolved vapors of sulfuryl chloride formed during the reaction to a condenser and returning the condensate to the reaction mass to dissipate exothermic heat of reaction and to control the reaction temperature within the range of 55–75° C., and continuing the reaction under reflux for a sufficient length of time until completion of the reaction as indicated by the cessation of carbon dioxide gas. By effecting interaction of urea, sulfur trioxide and sulfuric acid in the presence of sulfuryl chloride, effective control of the reaction is obtained. The heat generated is dissipated into heat of vaporization of sulfuryl chloride solvent at the reaction temperature and evolved vapors of sulfuryl chloride cooled, condensed and returned to the reaction zone to maintain close control of the reaction temperature without the necessity of pressure equipment.

In carrying out the process of the invention, the reactants may be brought together in a variety of ways. A convenient method is to add the sulfur trioxide all at once to the sulfuryl chloride in a reaction vessel. Equivalent amounts of urea and concentrated sulfuric acid may be prereacted to form urea bisulfate which is then added in molten form to the admixture sulfuryl chloride and sulfur trioxide in the reaction vessel.

Alternatively, urea, sulfur trioxide and sulfuric acid may be simultaneously brought in contact with each other in the presence of sulfuryl chloride desirably at a lower temperature, below about 40–45° C., and as a result of exothermic heat of reaction and if necessary application of heat to initiate the reaction, the temperature of the reaction mixture rises to about 66–72° C., in which range the temperature is maintained by reflux while sulfamic acid is being formed. In still another method the sulfuryl chloride, sulfur trioxide and sulfuric acid may be mixed and heated, and thereafter urea may be introduced over a comparatively short period. In any case the reaction takes place in the presence of sulfuryl chloride at a temperature sufficient to form sulfamic acid and to permit dissipation of heat formed by vaporization of the sulfuryl chloride.

The accompanying drawing illustrates preferred methods of carrying out the process of the present invention.

In the premix method of operation, urea entering through line 2 and sulfuric acid entering through line 3 are introduced into premix vessel 1 which may be any suitable enclosed vessel equipped with cooling means and an agitator not shown. The temperature in the premix vessel is maintained below 85° C. and molten urea bisulfate formed as a product of the reaction is then passed through line 4 to reactor 5 into which has previously been introduced sulfur trioxide entering through line 8 and sulfuryl chloride through line 9, which mixture is desirably heated to about 60° C. prior to introduction of urea bisulfate. Reactor 5 may be equipped with an agitator and provided with suitable heating means such as a jacket surrounding the reactor through which a heating medium flows. The conversion to sulfamic acid begins with the addition of urea bisulfate as evidenced by the evolution of carbon dioxide gas. The reaction temperature is generally maintained within the range of 55–75° C., preferably 68–70° C. and the pressure is substantially atmospheric. At the reaction temperature there is a continuous evolution of sulfuryl chloride vapors which passes through line 12 to reflux condenser 13 where the vapors are condensed and the condensate returned to the reactor through line 14. Reflux condenser 13 may be of any suitable type wherein vapors of sulfuryl chloride are cooled and condensed by indirect heat exchange with a cooling medium such as water and may be of the single or multipass, vertical or horizontal tube type. Carbon dioxide gas formed is released through line 12, passing through reflux condenser 13 and discharging through vent 15. The reaction is generally completed when carbon dioxide gas is no longer evolved. The formed product, sulfamic acid suspended as a solid in sulfuryl chloride is discharged through line 11 and the solid sulfamic acid product separated from the mixture by filtration.

In another embodiment sulfuric acid may be added to the reactor 5 through line 7 to be mixed with the sulfur trioxide and sulfuryl chloride previously heated to about 65° C. and solid urea in pellet form may be then gradually added through line 10 which maintaining the temperature at 60–70° C., by reflux of sulfuryl chloride. In a further embodiment all the reactants may be simultaneously brought together in reactor 5, the urea and sulfuric acid being added through lines 6 and 7 while sulfur trioxide and sulfuryl chloride are being added through lines 8 and 9 respectively. The admixture is desirably effected at a temperature below reaction, about 40–45° C., to prevent too rapid initial reaction, and thereafter the temperature is allowed to increase to the range of 68–70° C. to form sulfamic acid while simultaneously causing reflux of the sulfuryl chloride which acts as a medium for dissipating the heat of the reaction. Although variation in molar proportion of the reactants can be tolerated, it is preferred that substantially equimolar proportions of reactants be utilized in the reaction. The amount of sulfuryl chloride can be varied over a relatively wide range providing there is adequate sulfuryl chloride for reflux and as dispersing medium for the sulfamic acid. A molar ratio of sulfuryl chloride to urea of about 2 to 1 or higher and preferably at least 3 to 1 has been found satisfactory. Although high quantities of sulfuryl chloride may be used no particular advantage is obtained by use of quantities exceeding six mols per mol of urea.

The following examples illustrate the present invention.

*Example 1*

Sulfuryl chloride (200 parts) was placed in a reaction vessel equipped with reflux condenser and stirrer. Sulfur trioxide (52 parts) was added all at once, and the homogeneous mixture was then heated to reflux (about 60° C.). Urea bisulfate (73 parts) was added in molten form while maintaining steady reflux in the reaction vessel over a fifteen minute period. The temperature rose from 60 to 68° C., with some carbon dioxide evolution occurring during addition. Refluxing and stirring at 68–70° C. over three-quarters of an hour resulted in the evolution of the remaining major portion of carbon dioxide with completion of reaction. The yield of sulfamic acid product separated from the reaction mixture was 93%.

*Example 2*

Using the equipment of Example 1, the following reactants were mixed in the reactants flask below 40° C.: sulfuryl chloride (200 parts), urea (30 parts), sulfur trioxide (44 parts), and 100% sulfuric acid (49 parts). With stirring, the mixture was heated to reflux (68–70° C.) and was maintained there for three-quarters of an hour until carbon dioxide evolution ceased. Yield of sulfamic acid was 68%.

*Example 3*

Using the equipment of Example 1, sulfuryl chloride (200 parts), sulfur trioxide (44 parts) and 100% sulfuric acid (49 parts) were mixed and heated to reflux (65° C.). Solid urea (28 parts) was added over 15 minutes at 65 to 68° C. Refluxing and stirring were continued one-half hour at 68–70° C. to complete the reaction. A yield of 76% sulfamic acid was obtained.

Although certain preferred embodiments of the invention have been disclosed for purpose of illustration, it will be evident that various changes and modifications may be made therein without departing from the scope and spirit of the invention.

We claim:

1. A process for the production of sulfamic acid which comprises maintaining a mixture of urea, sulfur trioxide and sulfuric acid together with sulfuryl chloride at a temperature within the range of 55–75° C. in an enclosed reaction zone under substantially atmospheric pressure to effect reaction of the urea, sulfur trioxide and sulfuric acid to produce sulfamic acid and by-product carbon dioxide, releasing generated carbon dioxide and evolved vapors of sulfuryl chloride from the reaction zone, cooling the carbon dioxide gas and sulfuryl chloride vapor to effect condensation of the sulfuryl chloride, discharging the carbon dioxide gas, returning the sulfuryl chloride condensate to the reaction zone to maintain the temperature of reaction therein within the range of 55–75° C., and continuing the passage of evolved sulfuryl chloride vapor from the reaction zone, cooling of the sulfuryl chloride vapor and return of the sulfuryl chloride condensate to the reaction zone until substantial completion of the reaction of urea, sulfur trioxide and sulfuric acid is effective.

2. A process for the production of sulfamic acid which comprises admixing urea with sulfuric acid to form urea bisulfate, adding said urea bisulfate to a mixture of sulfur trioxide and sulfuryl chloride, maintaining a mixture of urea bisulfate and sulfur trioxide at a temperature within the range of 55–75° C. under substantially atmospheric pressure to effect reaction of the urea bisulfate and sulfur trioxide to produce sulfamic acid and by-product carbon dioxide, releasing generated carbon dioxide and evolved vapors of sulfuryl chloride from the reaction zone, cooling the carbon dioxide gas and sulfuryl chloride vapor to effect condensation of the sulfuryl chloride, discharging the carbon dioxide gas, returning the sulfuryl chloride condensate to the reaction zone to maintain the temperature of reaction therein within the range of 55–75° C. and continuing the passage of evolved sulfuryl chloride vapor from the reaction zone, cooling of the sulfuryl chloride vapor and return of the sulfuryl chloride condensate to the reaction zone until substantial completion of the reaction of urea bisulfate and sulfur trioxide is effective.

3. A process as claimed in claim 1 wherein the reactants, urea, sulfuric acid and sulfur trioxide are in approximately equimolar quantities and wherein the temperature of reaction is within the range of about 66–72° C.

4. In a process for the production of sulfamic acid by reaction of urea, sulfuric acid and sulfur trixode the improvement which comprises effecting said reaction in the presence of sulfuryl chloride as an inert solvent medium.

References Cited in the file of this patent
UNITED STATES PATENTS

| | | |
|---|---|---|
| 2,408,823 | Tauch | Oct. 8, 1946 |
| 2,436,658 | McQuaid | Feb. 24, 1948 |